Sept. 18, 1934.  T. IIO  1,974,157

BRUSH ACTUATING DEVICE FOR A REPULSION STARTING ELECTRIC MOTOR

Filed Dec. 14, 1932

INVENTOR:
TATSUJIRO IIO
BY: Ruege & Boyce
ATTORNEYS

Patented Sept. 18, 1934

1,974,157

UNITED STATES PATENT OFFICE 1,974,157

BRUSH ACTUATING DEVICE FOR A REPULSION STARTING ELECTRIC MOTOR

Tatsujiro Iio, Kamimeguro, Meguro Ku, Tokyo, Japan, assignor to Toa Denki Kabushiki Kaisha, Tokyo, Japan, a corporation of Japan Application December 14, 1932, Serial No. 647,180
In Japan December 31, 1931

1 Claim. (Cl. 172—279)

The present invention relates to a starting device for an electric motor, particularly to a brush actuating device for a repulsion starting electric motor.

One of the features of this invention is to prevent contact brushes of the repulsion starting electric motor from wearing and remove all disadvantages due to such wear of the brushes by energizing an electro-magnetic means to bring the brushes into contact with the commutator of the electric motor at its starting and breaking down the electric circuit of the electro-magnetic means to lift up the brushes automatically when the motor reaches such speed as to cause a short-circuiting device to short-circuit the commutator of the motor, and also keeping said brushes away from the commutator surface except during the starting period of said motor.

Another feature is to cut off the electric circuit of the electro-magnetic means by disengaging a short-circuit shoe from a pair of slip rings through a fly away motion of the shoe due to its centrifugal force, the coil of said electro-magnetic means being connected with the slip rings in series.

Another feature of the present invention is to obtain a brush actuating device having simple construction in which the magnetic iron core is provided at its opposite sides with armatures in such a manner as to attract each other and wherein brush holders connected with each armature are actuated at the same time by the excitation of the electro-magnetic means in order to bring the brushes in the holders into contact with the surface of the commutator.

Figure 1:
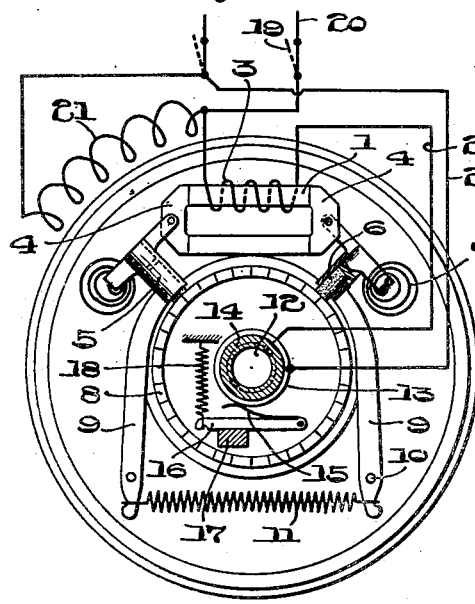
Figure 2:
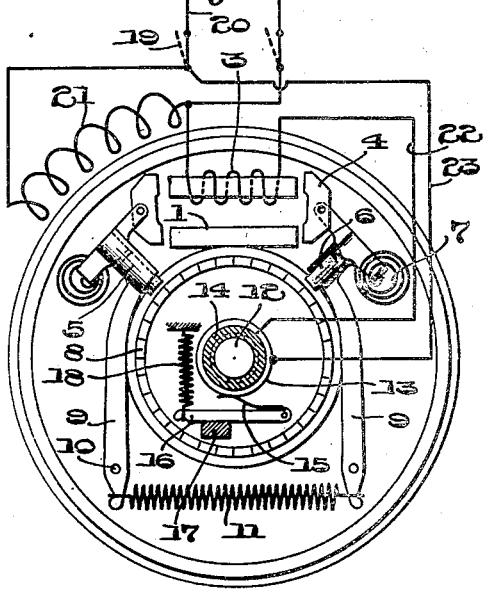
Figure 3:
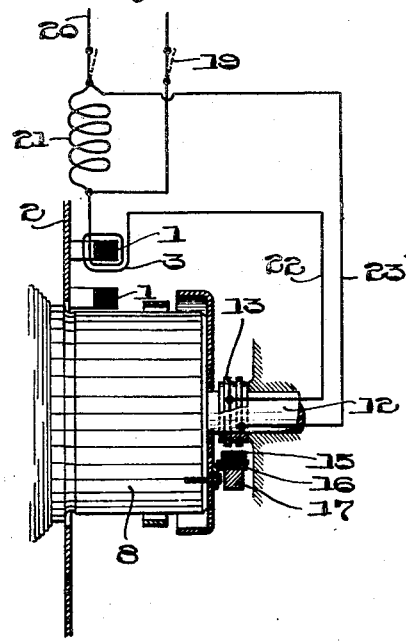
Figure 4:
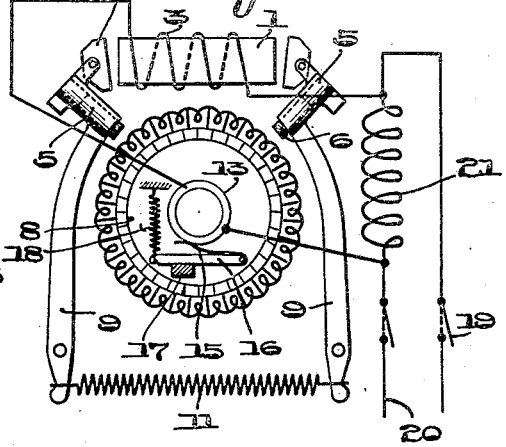

Referring to the accompanying drawing which shows an example of the embodiments of this invention, Figure 1 is a schematic drawing showing the main part of a brush actuating device for a repulsion starting electric motor according to this invention with its brushes in the position held during its starting period;

Fig. 2, a schematic drawing showing the continuous running state of the motor in which brushes are separated from the commutator surface;

Fig. 3, a side view of the commutator of a single phase induction motor provided with a brush actuating device according to this invention and Fig. 4, an electric connection diagram of the brush actuating device for a repulsion starting electric motor.

In the drawing, 1 is an electro-magnetic iron core secured to the side wall 2 of the main body of an electric motor, and by exciting a coil 3 wound upon the core 1 a pair of armatures 4 are attracted to the core, said armatures being provided at the opposite sides of the core 1 in such a manner as to attract each other. In the brush holders 5 connected with each of the armatures 4 there are contact brushes 6 each pressed by a spring 7 at its back surface so as to be brought into contact with the surface of a commutator 8. A pair of operating arms 9 connected integrally with each brush holder 5 are pivoted upon studs 10 and are adapted to be drawn by means of a spring 11 to separate the brushes 6 from the surface of the commutator 8 upon the deenergization of the electro-magnet 1.

A motor shaft 12 is provided with a pair of slip rings 13 insulated from the shaft 12 by the insulation 14 and the slip rings are adapted to be engaged electrically by means of a short-circuit shoe 15 during both the stationary and starting periods of the motor. The short-circuit shoe 15 is provided on a pivoted member 16 drawn against the action of a counter weight 17 by a spring 18 to keep said shoe in contact with the slip rings during the starting period of the motor and to be lifted away to disengage said shoe from the slip rings when the motor reaches the predetermined speed. It should, however, be understood that such a mechanical construction may be altered suitably, if necessary.

Upon throwing a main switch 19 onto the line 20, the stator coil 21 of the motor will be excited and simultaneously the electric current will be applied to a circuit including main line 20, switch 19, electro-magnetic coil 3, line 22, slip rings 13, short-circuit shoe 15, line 23 etc. Then, the electro-magnetic coil 3 is energized to attract the armatures 4 having the brush holders 5 attached thereto so as to bring the brushes 6 into contact with the commutator 8 and hold them there until the motor reaches a predetermined speed so as to cause the commutator to be short-circuited by a suitable short-circuiting device as indicated at 24, Fig. 3, which device is described and claimed in United States Patent No. 1,876,235, granted to me under date of September 6, 1932. The speed of the motor is such that the centrifugal force operating on the pivoted member 16 becomes strong enough to overcome the opposing force of the balance weight 17 and spring 18, so that said member is actuated to break the contact of the shoe 15 with the pair of slip rings 13. Thus, after the brushes are separated from the commutator, the disengagement of the brushes and commutator is maintained notwithstanding the reduction of the centrifugal force of the counter weight owing to the decrease of the speed of the motor and their engagement is regained when the motor stops.

According to the present invention, to motor is started as a repulsion motor having a considerable large starting torque, and after it reaches the predetermined speed it is not only kept in a smooth continuous running condition as a single phase induction motor, but the life of the contact brushes can be prolonged by removing friction loss between the brushes and commutator because of their disengagement during the normal running condition of the motor.

I claim:

The combination with a commutator of a repulsion starting electric motor, of a source of current for operating the motor, a pair of pivoted brush-carrying members disposed at opposite sides of the commutator, a spring operatively associated with said pivoted members for normally maintaining the brushes out of contact with the commutator, a switching device comprising a pair of slip rings mounted on but insulated from the motor shaft, centrifugally operative means rotatable with the motor and having a contact shoe for engaging both of said rings, electromagnetic means having a laminated iron core, an electric coil wound upon said laminated core, a pair of armatures carried by said brush-carrying members and disposed at opposite ends of said core whereby when the electromagnetic means is excited the armatures will be attracted thereby to rock said brush-carrying members on their pivots and carry the brushes into contact with the commutator, said coil being connected in series with said slip rings and in parallel with the field coil of the motor through said slip rings whereby said core-coil is supplied with current from the motor-operating source during the starting period of the motor.

TATSUJIRO IIO.